United States Patent [19]

Meek et al.

[11] Patent Number: 5,797,364
[45] Date of Patent: Aug. 25, 1998

[54] TOP TROUGH CAM ROLLER PIN

[75] Inventors: Matthew P. Meek; Frank M. Hager, both of Columbus, Ind.

[73] Assignee: Cummins Engine Company, Inc., Columbus, Ind.

[21] Appl. No.: 740,698

[22] Filed: Nov. 1, 1996

[51] Int. Cl.⁶ .................................................. F01M 9/10
[52] U.S. Cl. ............................. 123/90.36; 123/90.35; 123/90.42; 123/90.5; 184/6.5; 184/6.9; 384/375
[58] Field of Search .................... 123/90.33, 90.35, 123/90.36, 90.39, 90.41, 90.42, 90.44, 90.5; 184/6.5, 6.9; 384/291, 372, 375, 378

[56] References Cited

U.S. PATENT DOCUMENTS

| | | | |
|---|---|---|---|
| 703,838 | 7/1902 | Scobee | 384/375 |
| 1,292,312 | 1/1919 | Gronkwist | 184/6.5 |
| 1,354,852 | 10/1920 | Schneider | 184/6.5 |
| 1,377,866 | 5/1921 | White | 384/291 |
| 1,834,285 | 12/1931 | Loeffler | 184/6.5 |
| 2,349,203 | 5/1944 | Spencer | 184/6.9 |
| 2,563,699 | 8/1951 | Winter, Jr. | 74/519 |
| 2,629,639 | 2/1953 | Johansen | 384/155 |
| 2,821,970 | 2/1958 | Line | 123/90.55 |
| 2,938,508 | 5/1960 | Papenguth | 123/90.59 |
| 3,410,366 | 11/1968 | Winter, Jr. | 123/90.39 |
| 4,105,267 | 8/1978 | Mori | 384/291 |
| 4,258,673 | 3/1981 | Stoody, Jr. et al. | 123/90.34 |
| 4,325,589 | 4/1982 | Hirt | 384/375 |
| 4,896,635 | 1/1990 | Willermet et al. | 123/90.41 |
| 4,909,197 | 3/1990 | Perr | 123/90.39 |
| 5,127,374 | 7/1992 | Morel, Jr. et al. | 123/90.35 |

FOREIGN PATENT DOCUMENTS

| | | |
|---|---|---|
| 19194Ia-14g | 7/1956 | Germany . |
| 298610 | 12/1990 | Japan ............ 123/90.35 |
| 298611 | 12/1990 | Japan ............ 123/90.35 |

*Primary Examiner*—Weilun Lo
*Attorney, Agent, or Firm*—Woodard, Emhardt, Naughton Moriarty & McNett

[57] ABSTRACT

A cam roller pin for mounting a cam roller with a substantially uniform width to a rocker lever includes a substantially cylindrical pin body bounded by a pair of oppositely-disposed ends and having a length which extends from one end to the opposite end, the pin body defining an oblong trough therein which has a length that is at least 30 percent of the length of the pin body. The pin body has an outer surface which defines a passageway extending from the outer surface through the pin body and into one end of the oblong through. The passageway is configured with two portions having different entry locations into the pin body and the passageway provides a path for lubrication from the exterior of the cam roller pin to the oblong trough. In one embodiment of the present invention, the length of the oblong trough is substantially equal to the width of the cam roller so as to provide lubrication across the entire width, the oblong trough being positioned horizontally and opening upwardly so as to provide a lubrication reservoir.

10 Claims, 5 Drawing Sheets

TOP TROUGH CAM ROLLER PIN

BACKGROUND OF THE INVENTION

The present invention relates in general to the design of a cam roller pin which is modified to address the problem of cam lobe galling. More specifically the present invention relates to the design of an oil reservoir as part of a cam roller pin which is used in order to reduce the rolling friction between the cam roller and the cam roller pin.

One of the concerns in the design of the cam roller and cam lobe interface is how to reduce cam lobe galling. Galling is the process of material removal from the face of the cam lobe caused by the interaction between the cam roller and the cam lobe. Over time, if enough material is removed from the cam lobe, the cam lobe profile will be altered to the extent that a loss of timing events results.

In the typical internal combustion engine, the cam roller is pinned in position with a cam roller pin, the ends of which are supported in a fixed mounting. The pin has a near line-to-line fit in the cam roller such that the cam roller is able to turn or rotate on the pin in an accurate and controlled manner. Having adequate lubrication between the cam roller pin and the cam roller is important in order to help ensure rolling action of the cam roller about the pin. Rolling action is important in order to prevent galling.

If the cam roller does not freely rotate or turn on the cam roller pin, then there is a risk that the cam roller will skid on the cam lobe. Over time, such skidding can cause material to be removed from the cam lobe at the cam lobe interface with the cam roller. One of the causes of such skidding is low lubricity between the cam roller pin and the cam roller.

In order to try and maintain or even improve the level of lubricity between the cam roller pin and the cam roller, earlier pin designs have attempted to include some type of drilling or drill point reservoir for added oil. Another approach which has been tried is to machine relatively shallow, substantially flat plateaus into the outer surface of the cam roller pin. However, testing which has been conducted on this particular design approach has shown that such flat plateaus actually increase the interface friction and do not appear to help establish a lubricating film between the cam roller and the cam roller pin.

The M11 engine design offered by Cummins Engine Company of Columbus, Ind., has used a cam roller pin with machined flat plateaus. This style of cam roller pin is illustrated in FIGS. 1–3. The N14 engine design offered by Cummins Engine Company of Columbus, Ind., has used a cam roller pin without flat plateaus and with a small drill point oil reservoir. This cam roller pin is illustrated in FIGS. 4–6. In addition to the pin illustrations of FIGS. 1–6, a number of pin designs and lubricating concepts are disclosed in various issued patents. The following patents are believed to provide a representative sampling of these earlier designs:

| PATENT NO. | PATENTEE | ISSUE DATE |
| --- | --- | --- |
| 1,292,312 | Gronkwist | Jan. 21, 1919 |
| 1,354,852 | Schneider | Oct. 5, 1920 |
| 1,834,285 | Loeffler | Dec. 1, 1931 |
| 2,349,203 | Spencer | May 16, 1944 |
| 2,563,699 | Winter, Jr. | Aug. 7, 1951 |
| 2,629,639 | Johansen | Feb. 24, 1953 |
| 2,821,970 | Line | Feb. 4, 1958 |
| 2,938,508 | Papenguth | May 31, 1960 |
| 4,258,673 | Stoody, Jr. et al. | Mar. 31, 1981 |
| K19194Ia/14g | Germany | Jul. 12, 1956 |

Even in view of these earlier pin designs and the cooperating lubrication concepts, the present invention provides a unique combination of features which are novel and unobvious.

SUMMARY OF THE INVENTION

A cam roller pin for mounting a cam roller to a rocker lever according to the present invention includes a substantially cylindrical pin body which is bounded by a pair of oppositely-disposed ends and having a length which extends from one end to the opposite end, the pin body defining an oblong trough therein which has a length that is at least 30 percent of the length of the pin body. A passageway extends from the outer surface of the pin body, through the pin body and into the oblong trough. The passageway provides a lubrication flow path from the outside of the cam roller pin to the oblong trough which functions as a lubrication reservoir.

One object of the present invention is to provide an improved cam roller pin.

Related objects and advantages of the present invention will be apparent from the following description.

DESCRIPTION OF THE PREFERRED EMBODIMENT

Figure 1:
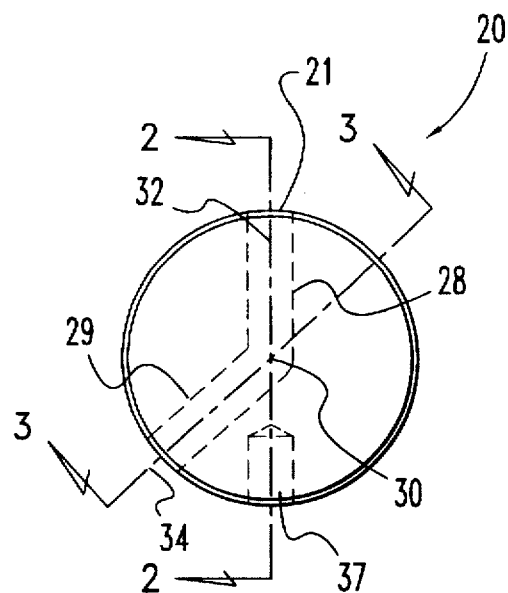
FIG. 1 is top plan view of a prior art cam roller pin which is used in a diesel engine.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
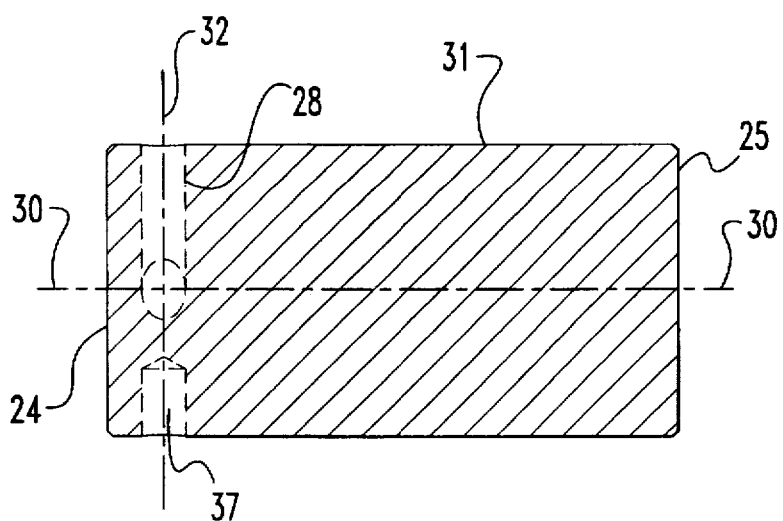
FIG. 2 is a side elevation view in full section of the FIG. 1 pin as viewed along line 2—2 in FIG. 1.
Figure 3:
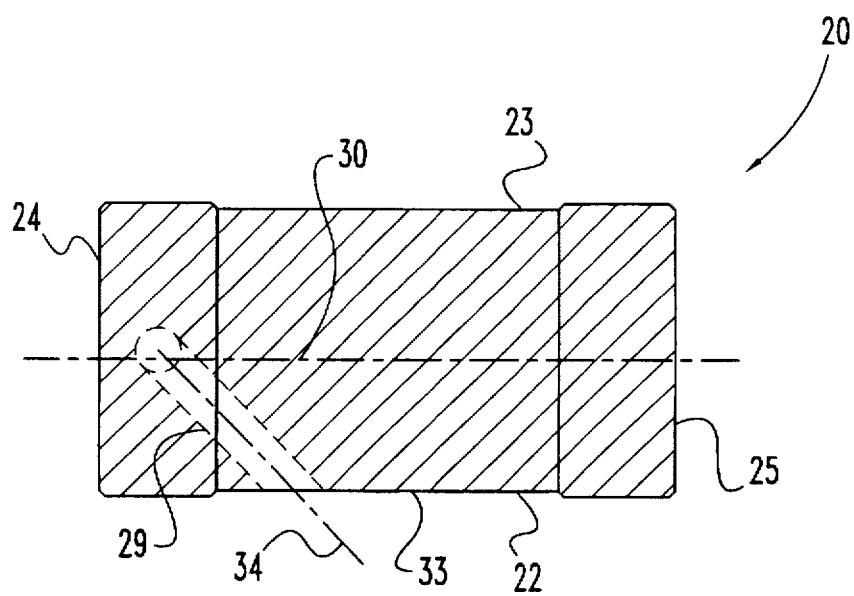
FIG. 3 is a side elevation view in full section of the FIG. 1 cam roller pin as viewed along line 3—3 in FIG. 1.

Referring to FIGS. 1–3, a prior art cam roller pin 20 is illustrated. Pin 20 has been used in the M11 diesel engine design offered by Cummins Engine Company of Columbus, Ind. Pin 20 is a substantially cylindrical pin with drilled passageway 21 extending laterally through the pin body and two substantially flat plateau portions 22 and 23. Plateau portions 22 and 23 are located along the sides of pin 20 approximately 180 degrees apart. The ends 24 and 25 of pin 20 are substantially flat and substantially parallel to each other.

Drilled passageway 21 includes two substantially straight portions 28 and 29 which intersect each other at a location which generally coincides with the longitudinal axis (line 30) of pin 20. Portion 28 is created by drilling inwardly from the outer surface 31 of pin 20 to a depth slightly beyond axis line 30. Portion 28 is drilled along a line 32 which is normal to axis line 30 and which is parallel to ends 24 and 25. Portion 29 is created by drilling inwardly from the outer surface 33 of plateau portion 22 of pin 20 to a depth which generally coincides with axis line 30 and which intersects portion 28. Portion 29 is drilled along a line 34 which is shifted by 47.5 degrees from line 32. Further, line 34 is upwardly inclined at an angle of approximately 44 degrees relative to the horizontal.

Passageway 21 establishes a lubrication pathway from the exterior of pin 20 to the flat plateau portion 22. The proper alignment of pin 20 into the rocker lever is achieved by use of the drill point 37 which is located directly across from portion 28. Lubrication pathways in the rocker lever communicate with passageway 21 and allow lubricating fluid to reach that portion of pin 20 which is located inside of the cam roller.

The present invention is an improvement to the design of pin 20 because in part, the pin of the present invention does not include any flat plateau portions along the sides of the pin body. Testing has shown that the level of friction between the cam roller and the cam roller pin is actually greater with a flatted cam roller pin as compared to a non-flatted cam roller pin. This particular feature of the present invention is important because it is believed that the level of friction between the cam roller and the cam roller pin, particularly at times of low lubricity such as startup, can be great enough to cause the cam roller to skid across the face of the cam lobe, rather than rolling across the face as is intended. Cam roller skidding is thought to be an initiator of cam galling. If cam roller/cam roller pin friction can be reduced, so can the likelihood of cam roller skidding.

Figure 4:
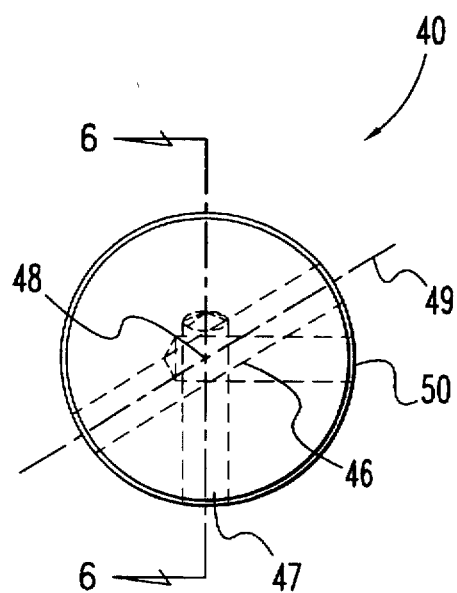
FIG. 4 is a top plan view of a prior art cam roller pin which is used in a diesel engine.
Figure 5:
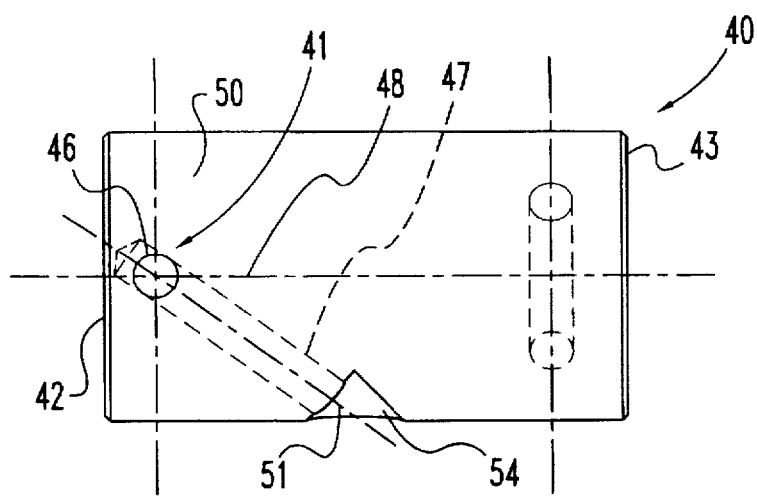
FIG. 5 is a side elevation view of the FIG. 4 cam roller pin.
Figure 6:
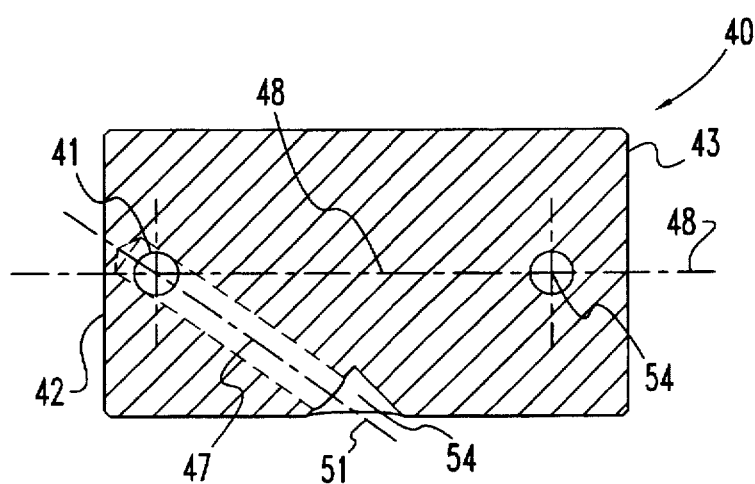
FIG. 6 is a side elevation view in full section of the FIG. 4 cam roller pin as viewed along line 6—6 in FIG. 4.

Referring to FIGS. 4–6, another prior art cam roller pin 40 is illustrated. Pin 40 has been used in the N14 diesel engine design offered by Cummins Engine Company of Columbus, Ind. Pin 40 is a substantially cylindrical pin with drilled passageway 41 extending laterally through the pin body. The ends 42 and 43 of pin 40 are substantially flat and substantially parallel to each other. In contrast to the design of pin 20, pin 40 does not include any flatted portions or plateaus as part of the pin 40 body.

Drilled passageway 41 includes two substantially straight portions 46 and 47 which intersect each other at a location which generally coincides with the longitudinal axis (line 48) of pin 40. Portion 46 is created by drilling inwardly from the outer surface 50 of the pin 40 to a depth slightly beyond axis line 48. Portion 46 is drilled along line 49 which is normal to axis line 48 and which is parallel to ends 42 and 43. Portion 47 is created by drilling upwardly from the outer surface 50 of pin 40 to a depth which generally coincides with axis line 48 and which intersects portion 46. In the FIG. 4 illustration, the entry locations for portions 46 and 47 are located on the circumference of pin 40 approximately 85 degrees apart. Portion 47 is inclined upwardly and inwardly along line 51 which is set at an angle of approximately 55 degrees relative to the horizontal.

Drill point 54 is recessed into outer surface 50 and is in communication with passageway 41 and in particular with portion 47. Drill point 54 provides a small reservoir for oil at the top of the pin body. At this point, it should be clarified that the pins 20 and 40 are typically oriented in their corresponding rocker levers in a substantially horizontal manner. With the cam shaft located below the rocker lever, the load bearing region of the pin is on the side of the cam shaft. The drill point reservoir 54 is located on the opposite, top side of the pin, approximately 180 degrees from the load bearing region. In this manner oil can be retained in the drill point reservoir and will remain suspended in the pin body. This small amount of oil is then immediately available at startup.

Figure 7:
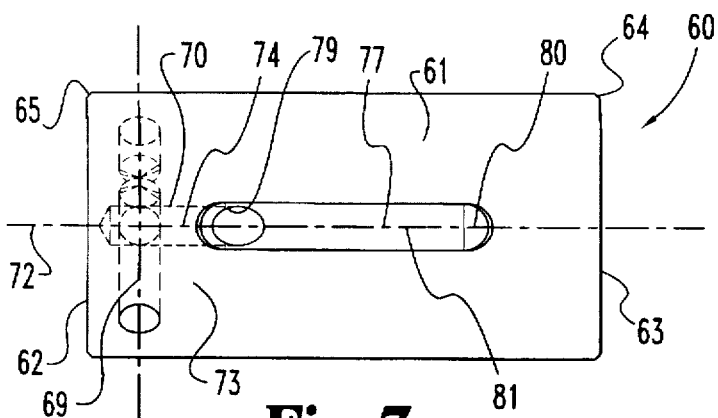
FIG. 7 is a diagrammatic, side elevation view of a cam roller pin according to a typical embodiment of the present invention.
Figure 8:
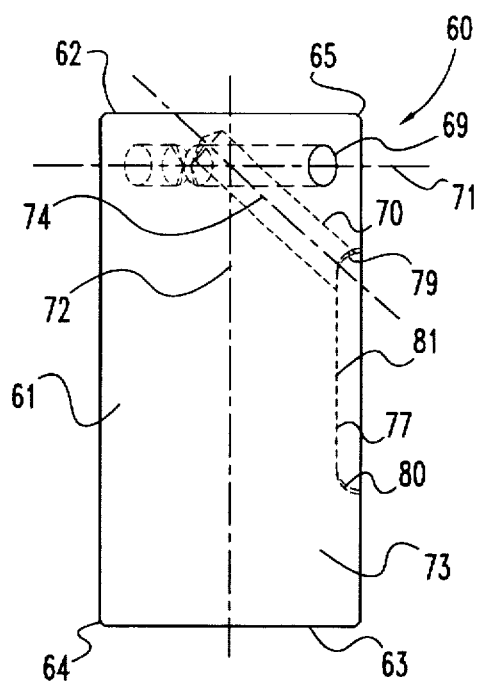
FIG. 8 is a diagrammatic, side elevational view of the FIG. 7 cam roller pin.
Figure 9:
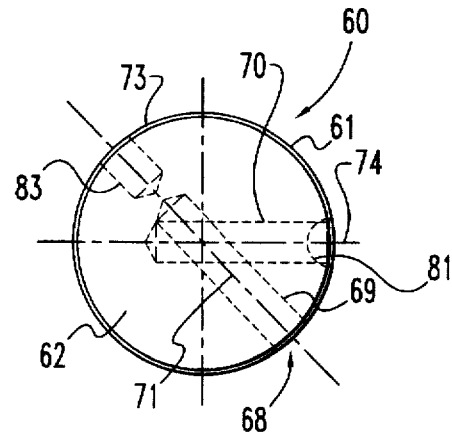
FIG. 9 is a diagrammatic, top plan view of the FIG. 7 cam roller pin.

The earlier design attempts represented by pins 20 and 40 have been improved upon by the present invention. The improved pin design according to the present invention is illustrated in FIGS. 7–9. Pin 60 includes a substantially cylindrical body 61 bounded by substantially flat ends 62 and 63 which are substantially parallel to each other. The edges 64 and 65 which form the junctions between the pin body 61 and ends 62 and 63, respectively, are chamfered so as to ease the press fit insertion of the pin 60 into the rocker lever. Even with the chamfered edges 64 and 65 adjacent each end, it is helpful to heat the rocker lever and cool the pin 60 in order to establish more clearance between the two at the time of insertion. As an improvement to the design of pin 20, pin 60 does not include any flat plateau portions or flatted sides on the pin body 61.

Pin 60 includes drilled passageway 68 which includes two portions 69 and 70. Portion 69 is a drilled hole which is concentric with line 71. Line 71 is substantially parallel with ends 62 and 63 and is substantially normal to the longitudinal axis (line 72) of the pin body 61. Portion 69 begins at outer surface 73 and extends inwardly to a depth beyond axis line 72. Portion 70 is a drilled hole which is concentric with line 74. Line 74 is indexed around the circumference of the pin body 61 from line 71 a distance of approximately 46 degrees.

The point of entry location of portion 70 into the pin body 61 is axially offset and spaced apart from the entry location of portion 69. This axial offset positions the point of entry location for portion 69 between the point of entry location for portion 70 and end 62. Line 74 has an upward and inward incline in the direction of the point of intersection between line 71 and axis line 72. The angle of incline of line 74 and in turn portion 70 is approximately 45 degrees relative to the horizontal. Portion 70 extends into the pin body 61 a depth which is sufficient for portion 70 to intersect portion 69 and thereby complete drilled passageway 68.

Located in the pin body 61 is an oblong, elongated trough 77 which is recessed below the outer surface 73 of the pin body. The oblong trough 77 has part-spherical ends 79 and 80 and a radiused inner surface 81. In order to create the desired size and geometry for trough 77, a 3/16 inch ball mill is used. The approximately depth of trough 77 into pin body 61 is 0.094 inches. The length of trough 77 is approximately 1.083 inches in a cam roller pin which has an approximate length of 1.832 inches. The length ratio of the trough to the pin of 0.591 to 1 represents a value which helps to ensure that sufficient lubricating fluid will be distributed across the length of the pin for startup and other situations of low lubricity in order to avoid roller skidding. If the size of the trough (i.e., lubrication reservoir) relative to the pin is too small, then not enough lubricating fluid will be available for the required task. Clearly the depth of the trough 77 and its shape are also important since we have to actually consider the volume of lubricating fluid which can be stored in this reservoir. The diameter of the pin is approximately 0.75 inches and thus the trough length is at least equal to the pin diameter. The ratio of the depth of trough 77 to the diameter of pin 60 in the preferred embodiment is approximately 0.125 to 1. If the trough 77 is machined too deep into pin 60, the machining cut will weaken the pin and could cause the premature failure of the pin. If the trough is not cut deep enough, the volume of lubricating fluid which can be stored will be reduced, possibly to an unacceptable level. If the pin diameter size is increased, then the trough can be increased in depth while still retaining the desired ratio. A percent range for the depth of trough 77 of between 8 percent and 17 percent of the pin 60 diameter is believed to be an acceptable balance.

Portion 70 intersects trough 77 at end 79 and thereby creates a lubrication flow path from the entry location of portion 69 into trough 77. The corresponding lubrication pathway for pin 60 includes and begins with portion 69, continues through portion 70, and ends up at trough 77. When the engine is in operation and the area inside the cylinder head cover is lubricated, the lubricating fluid is able to flow from outside of the rocker lever into portion 69 so as to feed lubricating fluid into the trough which in turn lubricates the interface between the cam roller and the cam roller pin. In order to enhance the delivery and distribution of lubricating fluid, the length of the trough 77 is approximately equal to the width of the cam roller. Pin 60 is an improvement to the design of pin 40 in view of the fact that trough 77 pools lubricating fluid along more of the pin's length than does the drill point design of pin 40. The trough provides a beneficial fluid distribution pattern along the length of the pin as compared to the undesirable situation of centralized oil. This pooled reservoir of lubricating fluid is immediately available at startup.

Pin 60 is oriented such that it is substantially horizontal relative to ground in its normal operating configuration. In this substantially horizontal orientation, and with the cam shaft located below pin 60, the load location on the pin is on its underside surface which is located approximately 180 degrees from the location of trough 77. This places the trough 77 in a substantially horizontal orientation relative to ground and the normal orientation for trough 77 is opening upwardly on the "top" side of pin 60. In this arrangement, as the engine stops and the lubricating fluid drains, some fluid will be retained in portions 69 and 70 and in trough 77. In the described horizontal and top position for trough 77, lubricating fluid is held in portions 69 and 70. It is important for the pin to be oriented such that the trough is at or near the "top dead center" position. If the trough is shifted by a few degrees in either direction off of top dead center, it will still function in the desired fashion.

While the entry location into pin 60 of portion 69 is actually below the level of trough 77, the section of pin 60 which receives portion 69 is press fit into the rocker lever. A feed hole in the rocker lever is aligned with portion 69 in order to provide a feed path for lubricating fluid. The entrance/exit aperture of this feed hole in the rocker lever is positioned above the vertical location of trough 77. Consequently, as the lubricating fluid seeks its own level as the lubricating fluid drains down, the trough 77 remains full since there is no drain aperture which is vertically lower or below the trough.

In order to ensure that the feed hole in the rocker lever is aligned with portion 69, a pilot hole 83 is drilled into pin body 61 at a circumferential location that is 180 degrees from the entry location of portion 69. A wire guide is then used to ensure that as pin 60 is press fit into the rocker lever, that the pin 60 can be rotated so as to establish alignment between the rocker lever feed hole and portion 69.

Figure 10:
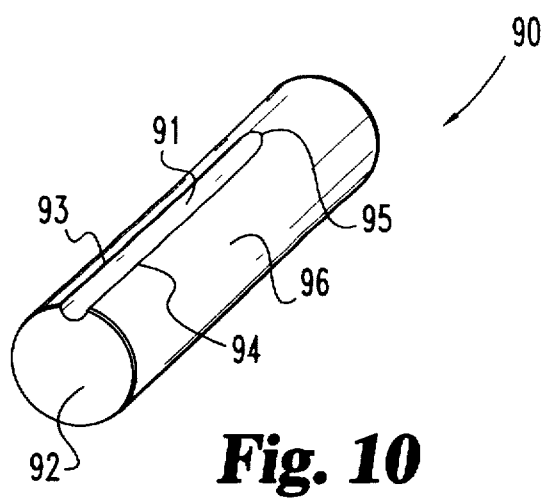
FIG. 10 is a perspective view of a cam roller pin which is designed according to one embodiment of the present invention.
Figure 11:
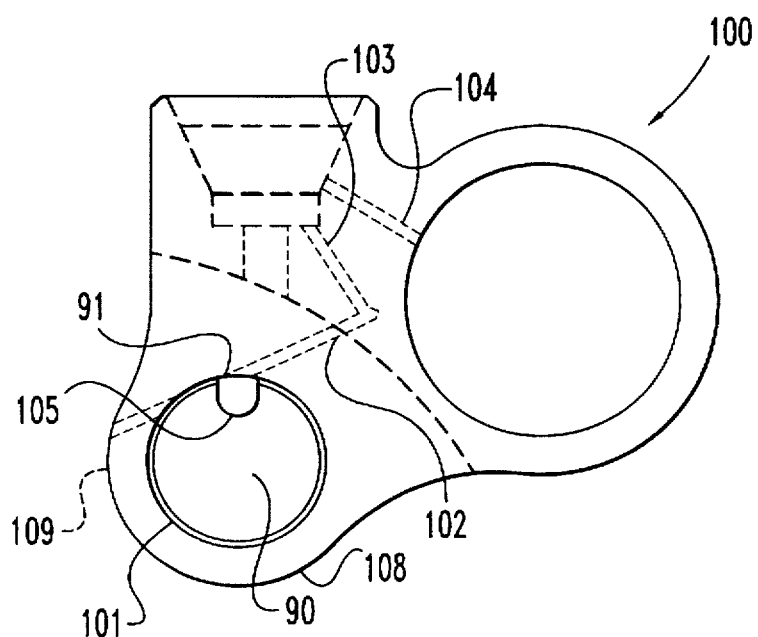
FIG. 11 is a front elevational view of a rocker lever/pin assembly according to the present invention.

Referring to FIGS. 10 and 11, another embodiment of the present invention is illustrated. The cam roller pin 90 which is illustrated in FIG. 10 includes a trough 91 positioned in the top or upwardly facing surface area of pin 90. Trough 91 extends from end 92 along the length of pin 90 for at least one-half of the pin length. The upper side edges 93 and 94 and curved end edge 95 cooperate to define the interface or dividing peripheral edge between trough 91 and the outer surface 96 of pin 90. There are no internal oil drillings (i.e., oil passageways) as part of pin 90. Instead, the oil feed and communication with trough 91 is achieved by extending the trough 91 out through pin end 92 and by using an oil drilling which is part of and defined by the rocker lever (see FIG. 11).

Referring to FIG. 11, a rocker lever 100 is illustrated with pin 90 inserted into hole 101. Various oil drilling passageways are machined into rocker lever 100 and the locations of these drilling passageways are denoted by parallel pairs of broken lines 102, 103, and 104. The intersection of lines 102 and 103 provides a feed path for oil into trough 91. It will also be seen that the end of pin 92 and the open end 105 of trough 91 are visible in hole 101.

Portion 108 is one-half or one side of a clevis-like arrangement which receives pin 90. There are two thinner portions, 108 on the front side and 109 on the back side, which create the clevis-like arrangement and actually receive the ends of pin 90. The center area between the two portions 108 and 109 is open. In order to feed oil into trough 91, drilling line 102 extends through thinner portion 108 which receives pin end 92 and the trough open end 105. The drilling passageway represented by broken lines 102 breaks out above trough 91 in the press-fit region between the pin 90 and rocker lever 100.

As with the earlier embodiment, it is important for pin 90 to be oriented such that the trough 91 is at or near the "top dead center" position. However, if the trough is shifted by a few degrees in either direction off of top dead center, it will still function in the desired fashion. Likewise, it is not critical for the drilling passageway represented by broken lines 102 to break out in the exact geometric center of trough 91. What is important is for this drilling passageway to break out above trough 91 so that there will be oil communication through the drilling passageway into trough 91.

As should be understood, the center area between the two portions 108 and 109 is configured so as to receive a cam roller, the cam roller being mounted on the cam roller pin 90. The cam roller is designed with a substantially uniform width and in the preferred embodiment, the oblong trough 91 has a length which is substantially equal to the width of the cam roller. Accordingly, due to the thickness of portion 108, this dimensional relationship will ensure that a majority of the cam roller width is contiguous to a portion of the oblong trough 91.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A cam roller pin comprising:

a substantially cylindrical pin body bounded by a pair of oppositely-disposed ends and having a length which extends from one end to the opposite end, said pin body defining an oblong trough therein which has a length that is at least 30 percent of the length of the pin body, said pin body having an outer surface and defining a passageway extending from said outer surface, through said pin body and into said oblong trough, wherein said passageway includes a first portion which extends into said pin body from a first entry location and a second portion which extends into said pin body from a second entry location, said first and second entry locations being separated from each other circumferentially and axially, said first portion intersecting said second portion.

2. The cam roller pin of claim 1 wherein said second entry location is positioned at one end of said oblong trough.

3. The cam roller pin of claim 2 wherein said pin body further defines an alignment recess having a recess entry location on said outer surface, said recess entry location being circumferentially spaced from said first entry location by approximately 180 degrees.

4. The cam roller pin of claim 3 wherein said pin body has a diameter size and the depth of said oblong trough is between 8 percent and 17 percent of the pin body diameter.

5. The cam roller pin of claim 1 wherein said pin body further defines an alignment recess having a recess entry location on said outer surface, said recess entry location being circumferentially spaced from said first entry location by approximately 180 degrees.

6. The cam roller pin of claim 1 wherein said pin body has a diameter size and the depth of said oblong trough is between 8 percent and 17 percent of the pin body diameter.

7. A cam roller pin for mounting a cam roller with a substantially uniform width to a rocker lever, said cam roller pin comprising:

a substantially cylindrical pin body having a diameter size and axial length, said pin body defining an elongated trough therein, said elongated trough having a length which is substantially equal to the width of said cam roller, said pin body having an outer surface and defining a passageway extending from said outer surface, through said pin body and into said elongated trough, wherein said passageway includes a first portion which extends into said pin body from a first entry location and a second portion which extends into said pin body from a second entry location, said first and second entry locations being separated from each other circumferentially and axially, said first portion intersecting said second portion.

8. The cam roller pin of claim 7 wherein said second entry location is positioned at one end of said elongated trough.

9. The cam roller pin of claim of claim 8 wherein the depth of said elongated trough is between 8 percent and 17 percent of the pin body diameter.

10. The cam roller pin of claim 7 wherein the depth of said elongated trough is between 8 percent and 17 percent of the pin body diameter.

* * * * *